US010232482B2

United States Patent
Suzuki et al.

(10) Patent No.: US 10,232,482 B2
(45) Date of Patent: Mar. 19, 2019

(54) WORK SEATING DETECTION DEVICE AND ADJUSTMENT METHOD FOR SAME

(71) Applicant: FUJI CORPORATION, Chiryu (JP)

(72) Inventors: Toshifumi Suzuki, Toyota (JP); Osamu Nagai, Nagoya (JP)

(73) Assignee: FUJI CORPORATION, Chiryu (JP)

( * ) Notice: Subject to any disclaimer, the term of this patent is extended or adjusted under 35 U.S.C. 154(b) by 364 days.

(21) Appl. No.: 15/027,380

(22) PCT Filed: Oct. 8, 2013

(86) PCT No.: PCT/JP2013/077297
§ 371 (c)(1),
(2) Date: Apr. 5, 2016

(87) PCT Pub. No.: WO2015/052764
PCT Pub. Date: Apr. 16, 2015

(65) Prior Publication Data
US 2016/0243662 A1 Aug. 25, 2016

(51) Int. Cl.
*B23B 31/00* (2006.01)
*B23Q 17/00* (2006.01)

(52) U.S. Cl.
CPC ............ *B23Q 17/006* (2013.01); *B23B 31/00* (2013.01); *B23B 2231/26* (2013.01); *Y10T 29/49776* (2015.01); *Y10T 279/21* (2015.01)

(58) Field of Classification Search
CPC ................ B23B 31/00; B23B 2231/26; B23B 2270/48; B23Q 17/006; B23Q 17/002;
(Continued)

(56) References Cited

U.S. PATENT DOCUMENTS 5,540,082 A 7/1996 Okuyama et al.
6,674,029 B2 * 1/2004 Okuyama ........... G01L 19/0015
200/187
(Continued)

FOREIGN PATENT DOCUMENTS

DE 102006012179 A1 * 9/2007 ........... B23Q 17/003
JP 4-336990 A 11/1992
(Continued)

OTHER PUBLICATIONS

Machine translation, German Patent Document, DE 102006012179, M. Walter, Sep. 20, 2007.*
(Continued)

*Primary Examiner* — Eric A Gates
*Assistant Examiner* — Chwen-Wei Su
(74) *Attorney, Agent, or Firm* — Oblon, McClelland, Maier & Neustadt, L.L.P.

(57) ABSTRACT

A work seating detection device including a detection hole formed to discharge air from a work seating face of a chuck, a detection flow path connecting an air supply source supplying compressed air and the detection hole, a pressure switch detecting a secondary-side pressure of a throttle portion formed in the detection flow path, and a pressure regulator adjusting the secondary-side pressure is provided. An adjustment flow path branching on a secondary side of the throttle portion is formed in the detection flow path, an on-off valve is disposed at the adjustment flow path, an adjustment block provided with an adjustment face pressing an adjustment gauge is integrally formed in a tip portion, and an adjustment hole having the same size as the detection hole and communicating with the adjustment flow path is formed in the adjustment block for an opening portion to be positioned in the adjustment face.

8 Claims, 4 Drawing Sheets

(58) Field of Classification Search
CPC ................. B23Q 17/003; Y10T 279/21; Y10T 29/49776
See application file for complete search history.

(56) References Cited

U.S. PATENT DOCUMENTS

2002/0178838 A1* 12/2002 Sato ..................... B23Q 17/002
                                                            73/861.63
2011/0016939 A1*  1/2011 Clew ................... B21D 39/031
                                                            72/31.01

FOREIGN PATENT DOCUMENTS

| JP | 6-249636   A   | 9/1994 |
| JP | 3456341     B2 | 10/2003 |
| JP | 2006-055975 A  | 3/2006 |
| JP | 2008023702  A * | 2/2008 |

OTHER PUBLICATIONS

International Search Report dated Nov. 5, 2013, in PCT/JP2013/077297 filed Oct. 8, 2013.

* cited by examiner

WORK SEATING DETECTION DEVICE AND ADJUSTMENT METHOD FOR SAME

TECHNICAL FIELD

The present disclosure relates to a work seating detection device that is provided in a processing machine such as a machine tool which performs a predetermined processing on a work gripped by a chuck and detects an appropriate seating of the work with respect to the chuck and, more particularly, to a work seating detection device and an adjustment method for same facilitating an adjustment operation for performing accurate seating detection.

BACKGROUND ART

A machine tool such as a lathe performs cutting with a work fixed to a chuck of a main spindle and a cutting tool abutting against the rotating work. An inaccurate contact between the work and a seating face of the chuck in this case leads to extra cutting of the work and a reduction in finish quality. PTL 1 and PTL 2 disclose work seating detection devices that detect an appropriate seating of the work with respect to the main spindle chuck. In these work seating detection devices, compressed air is supplied from an air supply source to a detection hole that is formed in the chuck of the main spindle and a back pressure of the compressed air is detected by a pressure switch. In a state where the work is appropriately seated, the compressed air rarely leaks, and thus a high back pressure is obtained. In a case where the work is in a state of inappropriate seating, a large amount of the compressed air leaks from a gap and the back pressure is reduced. A confirmation of whether or not the work is appropriately seated with respect to the main spindle chuck is performed by the back pressure being detected.

CITATION LIST

Patent Literature

PTL 1: Japanese Patent No. 3456341
PTL 2: JP-A-2006-055975

SUMMARY

Problem to be Solved

In the work seating detection device, a reference value depending on the size of the gap between the work and the seating face is set so that the appropriate seating state and the inappropriate seating state are distinguished from each other. Accordingly, in the work seating detection device, appropriate seating detection is required to be performed with the pressure switch operated in a predetermined manner in accordance with the reference value. In this regard, back pressure adjustment has been performed in the work seating detection devices according to the related art. An adjustment gauge that allows a predetermined gap to be formed between the work and the seating face is used in the back pressure adjustment, and the back pressure that is caused in a state where the adjustment gauge is gripped by the chuck is adjusted through an operation of a flow regulating valve or the like by an operator. An adjustment method with respect to these work seating detection devices according to the related art is carried out with the adjustment gauge being allowed to abut against the chuck by the operator. Accordingly, the operator himself or herself needs to use the adjustment gauge with his or her own hand. When the chuck is at a position distanced from a standing position of the operator, the hand that holds the adjustment gauge is unlikely to be seen and it is difficult to operate the adjustment gauge and the flow regulating valve at the same time, which results in a lower level of workability.

An object of the present disclosure, which is to address the above-described problem, is to provide a work seating detection device and an adjustment method for same improving workability for adjustment.

Means for Solving the Problem

A work seating detection device according to an aspect of the present disclosure includes a detection hole formed to discharge air from a work seating face of a chuck gripping a work, a detection flow path connecting an air supply source supplying the air at a predetermined pressure and the detection hole to each other, a pressure switch detecting a secondary-side pressure of a throttle portion formed in the detection flow path, and a pressure regulator adjusting the secondary-side pressure, in which an adjustment flow path branching on a secondary side of the throttle portion is formed in the detection flow path, an on-off valve is disposed at any position of the adjustment flow path, an adjustment block provided with an adjustment face pressing an adjustment gauge is integrally formed in a tip portion, and an adjustment hole having the same size as the detection hole and communicating with the adjustment flow path is formed in the adjustment block for an opening portion to be positioned in the adjustment face.

An adjustment method for a work seating detection device according to another aspect of the present disclosure, which has a detection hole formed to discharge air from a work seating face of a chuck gripping a work, a detection flow path connecting an air supply source supplying the air at a predetermined pressure and the detection hole to each other, a pressure switch detecting a secondary-side pressure of a throttle portion formed in the detection flow path, and a pressure regulator adjusting the secondary-side pressure, in which an adjustment flow path branching on a secondary side of the throttle portion is formed in the detection flow path, an on-off valve is disposed at any position of the adjustment flow path, an adjustment block provided with an adjustment face pressing an adjustment gauge is integrally formed in a tip portion, and an adjustment hole having the same size as the detection hole and communicating with the adjustment flow path is formed in the adjustment block for an opening portion to be positioned in the adjustment face, includes allowing a virtual work to be gripped by the chuck such that the detection hole is blocked by the virtual work having a flat abutting surface being allowed to abut against the work seating face, allowing the adjustment gauge with a groove where an adjustment groove discharging the air from the adjustment hole is formed to abut against the regulation surface, and operating the pressure regulator such that the secondary-side pressure changing depending on a size of the adjustment groove of the adjustment gauge corresponds to a predetermined set value.

Effects

According to the present disclosure, the adjustment flow path branching from the detection flow path is formed on the secondary side of the pressure regulator and the adjustment operation is performed by the adjustment gauge being pressed onto the adjustment block disposed in a place other than the chuck, and thus the pressing of the adjustment block and the operation of the pressure regulator can be performed at a position close to a standing position of an operator and workability for the adjustment is improved.

DESCRIPTION OF EMBODIMENTS

Figure 1:
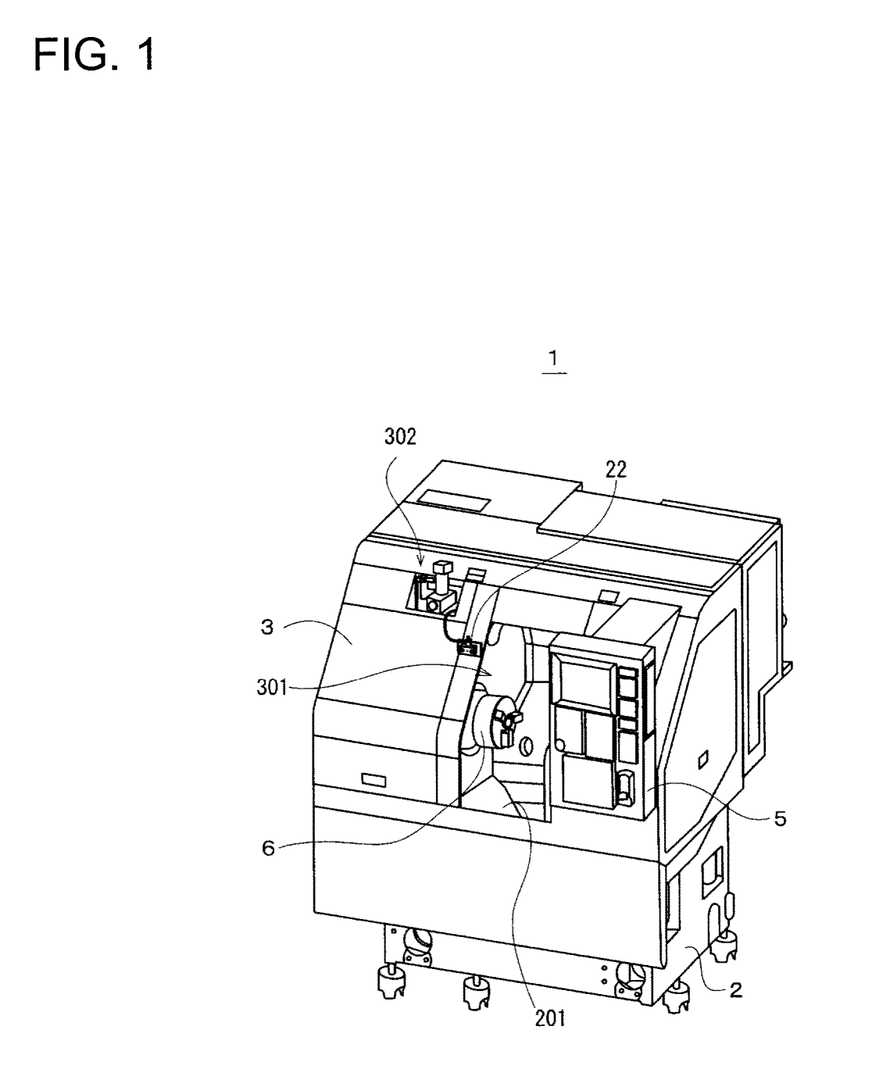
FIG. 1 is a perspective view illustrating a processing machine that is provided with a work seating detection device, which is an NC lathe to be specific.

Hereinafter, an embodiment of a work seating detection device and an adjustment method for same according to the present disclosure will be described with reference to accompanying drawings. FIG. 1 is a perspective view illustrating a processing machine that is provided with the work seating detection device according to this embodiment, which is an NC lathe to be specific. In other words, the work seating detection device described herein is configured in a main spindle chuck of a machine tool.

Although not illustrated in detail, a headstock that grips a work with respect to a main spindle bed 2, a turret device that holds a tool, and a driving mechanism that moves the turret device on an X axis, a Z axis, and the like are disposed in an NC lathe 1. In the NC lathe 1, a processing part that is configured to have these mechanisms is covered by a main body cover 3. The main body cover 3, which is integrated with the bed 2, is an outer shell of the NC lathe 1. The main body cover 3 prevents chips resulting from cutting of the work or the like from scattering by confining the driving mechanism and turning a processing portion into a closed space.

The main body cover 3 has a work entrance 301 formed at the center of a front surface, and the main body cover 3 is opened and closed by a slide door being moved leftward and rightward in a lateral direction. A state where the slide door is open is illustrated in FIG. 1. The slide door can be opened and closed automatically. Accordingly, the work is automatically conveyed by an autoloader (not illustrated) or the like, and the work can be automatically fed into a chuck 6 in the NC lathe 1 from the open work entrance 301 and can be automatically taken out to the open work entrance 301 from the chuck 6 in the NC lathe 1. A control device 5 is disposed in the NC lathe 1. The control device 5 is placed next to the work entrance 301 and is fixed to the main body cover 3.

The processing part of the NC lathe 1 is behind the work entrance 301. There, the chuck 6 is formed integrally with a rotating main spindle. The work, which is an object to be processed, is gripped by this chuck 6 and is allowed to rotate. A cutting tool or the like that performs the processing is mounted on the turret device. This turret device holds a plurality of the tools, and a relevant one of the tools is selected. Then, the tool is moved through a predetermined trajectory by a driving device, and the processing is performed by the cutting tool abutting against the rotating work. A box-shaped chip collection unit 201 that is open upward is formed below the processing portion where this processing is performed so that the chips resulting from the processing are collected. In the NC lathe 1, a processing space is present in the main body cover 3 and the chuck 6 is placed behind the work entrance 301 as described above.

Figure 2:
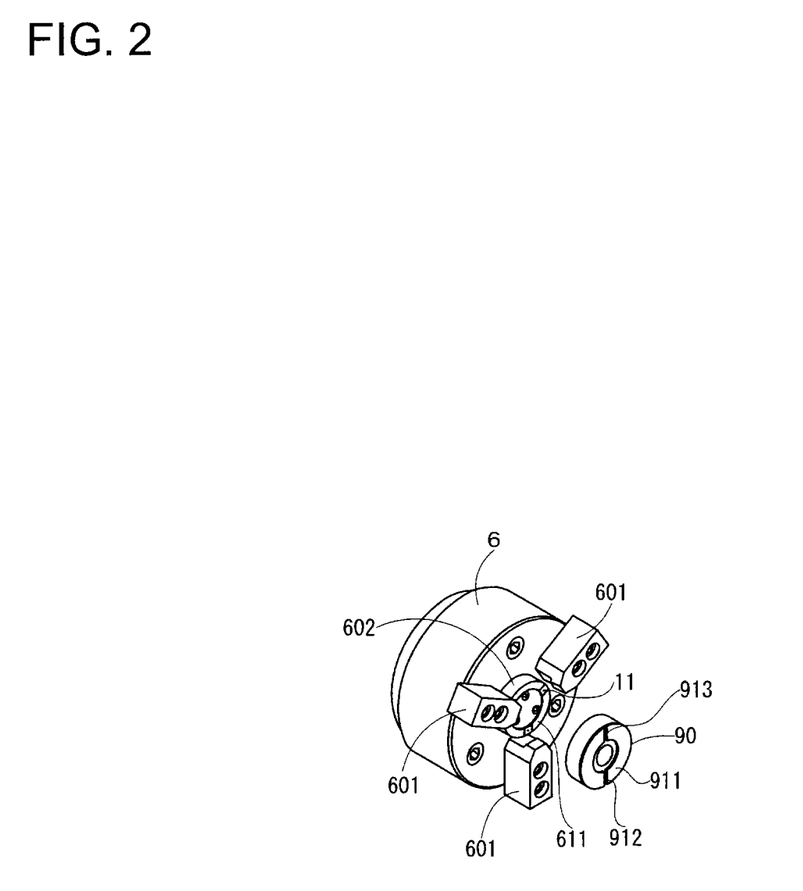
FIG. 2 is an enlarged perspective view illustrating a chuck of the NC lathe.
Figure 3:
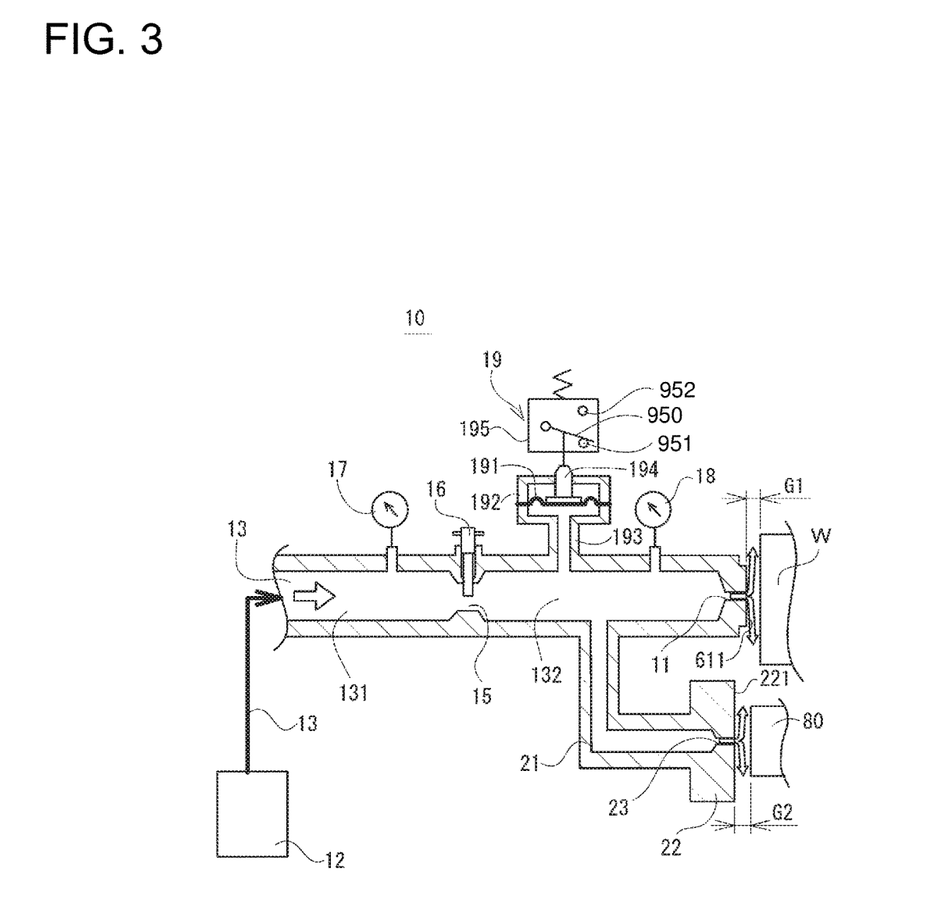
FIG. 3 is a schematic configuration diagram illustrating an operation principle of an embodiment of the work seating detection device.

FIG. 2 is an enlarged perspective view illustrating the chuck 6. The chuck 6 is provided with chuck pawls 601 that are placed in three directions, and a strip 602 that presses the work is formed at the center of the chuck 6. Each of the chuck pawls 601 moves in a radial direction. The work that is seated on the strip 602 is gripped by the three chuck pawls 601 and is set in a state where the work can be processed on the chuck 6. Attachment of the chips or the like to a seating face 611 of the strip 602 in this case causes the set work to float from the seating face 611, which results in a gap between the work and the seating face 611. When the gap widens, the amount of cutting with respect to the work increases and a processing defect follows. The work seating detection device is disposed in the NC lathe 1 so that this processing defect is forestalled. FIG. 3 is a schematic configuration diagram illustrating an operation principle of the work seating detection device according to the embodiment.

A work seating detection device 10 detects a pressure in a detection flow path 13 depending on an opening state of detection holes 11 by using a pressure switch 19 with compressed air supplied from an air supply source toward the detection holes 11 formed in the chuck 6. As illustrated in FIG. 2, the detection hole 11 is a through-hole with a diameter of 1 mm that is formed in the strip 602 of the chuck 6, and an opening portion of the detection hole 11 is positioned in the seating face 611. The seating face 611 is annularly formed along an outer periphery of the disk-shaped strip 602. The three detection holes 11 are formed for the opening portions to be positioned at intervals of 120° on the seating face 611. Specifically, the three detection holes 11 are formed in alignment with positions of the three chuck pawls 601. In FIG. 3, only one of the three detection holes 11 is illustrated.

The compressed air is fed into the work seating detection device 10 that is disposed in the NC lathe 1 from an air supply source 12 such as a compressor in a factory. A connection port for taking the compressed air is formed and the detection flow path 13 that extends from this connection port to the detection hole 11 is disposed in the NC lathe 1. In the detection flow path 13, a metering orifice 15 is disposed a predetermined distance in front of the detection hole 11. The metering orifice 15 regulates the pressure and flow rate of the compressed air that is supplied to a secondary side thereof. In this embodiment, a flow regulating valve 16 that is integrated with the metering orifice 15 is formed on the detection flow path 13, and thus a throttle amount of an air flow path can be adjusted. In the work seating detection device 10, back pressure adjustment is performed on the detection hole 11 by the flow regulating valve 16.

In the detection flow path 13, a supply-side pressure gauge 17 is disposed on a primary-side flow path 131 and a back pressure gauge 18 is disposed on a secondary-side flow path 132 across the metering orifice 15. In addition, the pressure switch 19 is disposed on the secondary-side flow path 132. The pressure switch 19 according to this embodiment has an inner portion of a body 192 partitioned into upper and lower chambers by a flexible diaphragm 191. The chamber beneath the diaphragm 191 is connected to the detection flow path 13 via a connection flow path 193. On the upper side of the chamber on the diaphragm 191, a rod 194 is fixed to the diaphragm 191. The rod 194 is connected to a switch lever 950 of a switch portion 195, and a first contact point 951 and a second contact point 952 are switched ON/OFF by the diaphragm 191 being bent.

An ON signal of the first contact point 951 shows a state where a back pressure in the secondary-side flow path 132 is low, that is, a state where a large amount of the compressed air is ejected from the detection hole 11. In other words, the ON signal of the first contact point 951 shows that a large amount of the compressed air is blown out from the detection hole 11 and a work W is in an unseated state with respect to the seating face 611 or in an inappropriate seated state with a wide gap G1. An ON signal of the second contact point 952 shows that a state where the back pressure in the secondary-side flow path 132 is high. That is, the ON signal shows a state where the back pressure is high without the compressed air being discharged from the blocked detection hole 11 because the work W is appropriately seated with respect to the seating face 611. This pressure switch 19 is an example that is illustrated in this embodiment, and the use of other pressure switches causes no problem at all.

In this embodiment, a product processed in a state where the work W is 0.05 mm afloat from the seating face 611 (state where the gap G1 is 0.05 mm) is determined as a defective product. In other words, 0.05 mm is used as a reference value with regard to the size of the gap G1, the gap G1 with a size of at least 0.05 mm is regarded as inappropriate seating, and the gap G1 with a size of less than 0.05 mm is allowed as appropriate seating. Accordingly, in the work seating detection device 10, a setting for the second contact point 952 to be put into an ON state within a predetermined period of time by the rising back pressure in the secondary-side flow path 132 is performed in a case where the gap G1 is less than approximately 0.05 mm. To this end, the back pressure adjustment needs to be performed so that the pressure switch 19 is appropriately operated depending on the size of the gap G1 between the work W and the seating face 611.

In work seating detection devices according to the related art, the back pressure adjustment should be performed by an adjustment gauge being placed on the chuck 6 by an operator. However, an adjustment mechanism is added to the work seating detection device 10 according to this embodiment so that the back pressure adjustment can be performed with a part other than the chuck 6 part. In this adjustment mechanism, an adjustment flow path 21 branches from the secondary-side flow path 132 part of the air supply flow path 13 and an adjustment block 22 is disposed at a tip of the adjustment flow path 21. An adjustment hole 23 that communicates with the adjustment flow path 21 is formed in the adjustment block 22. The adjustment hole 23 is a through-hole with a diameter of 1 mm as is the case with the detection hole 11 and is formed at the center of a flat adjustment face 221 of the adjustment block 22.

As illustrated in FIG. 1, the adjustment block 22 is fixed outside the main body cover 3 and is positioned in a front surface portion of the NC lathe 1. In this embodiment, each of equipment constituting the work seating detection device 10, such as the pressure switch 19, is placed in a device installation portion 302 that is in the front surface portion of the main body cover 3 as well. The adjustment block 22 is placed close to the device installation portion 302 and is kept within a range that is handled as almost the same eye line by the operator. The adjustment block 22 is placed at a substantially central part of the NC lathe 1 in particular in view of the operator's standing position or the like or is placed at a height that can be easily handled by the operator.

Figure 4:
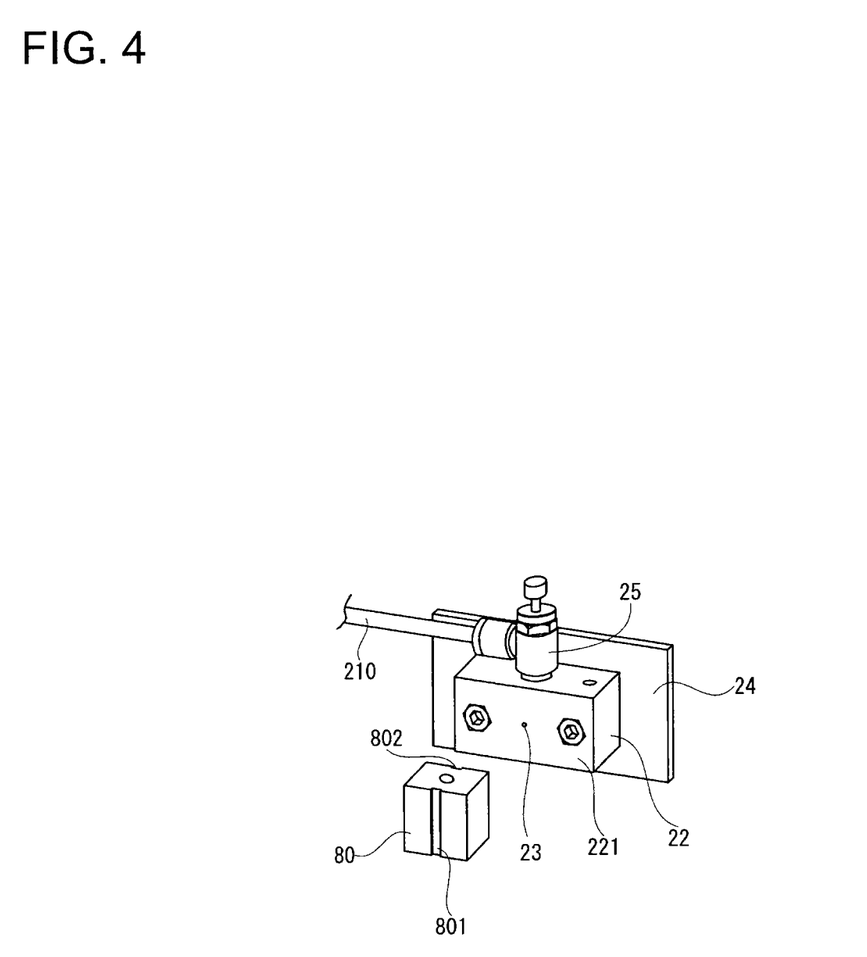
FIG. 4 is an enlarged perspective view illustrating the part of an adjustment block of the work seating detection device.

FIG. 4 is an enlarged perspective view illustrating the part of the adjustment block 22. The adjustment block 22 is fixed to the main body cover 3 via an integrated supporting plate 24. A flexible adjustment hose 210 that constitutes the adjustment flow path 21 is connected to the adjustment block 22 by extending from an inner portion of the main body cover 3. This flexible adjustment hose 210 allows the adjustment block 22 to have a free installation position. An on-off valve 25 is disposed between the adjustment hose 210 and the adjustment block 22. The on-off valve 25 remains closed under normal circumstances, allowing the adjustment flow path 21 to be blocked from the atmosphere. In FIG. 3, the on-off valve 25 is not illustrated for convenience. However, the on-off valve 25 is present originally.

Hereinafter, an effect and the like of the work seating detection device 10 will be described. Firstly, the work W is conveyed with respect to the NC lathe 1 by the autoloader, and the work W fed from the work entrance 301 is gripped by the chuck 6. In the work seating detection device 10, the compressed air is fed into the detection flow path 13 from the air supply source 12 at all times and the compressed air is discharged to the atmosphere from the detection holes 11. After the work W is gripped by the chuck 6, the work W is pressed onto the seating face 611 of the strip 602 and the opening portions of the detection holes 11 are blocked. The pressure in the detection flow path 13 increases by exhaust of the compressed air being blocked in this case. The back pressure of the secondary-side flow path 132 increases, and thus the pressure switch 19 is switched, and then the second contact point 952 is put into the ON state, a detection signal is transmitted, and an appropriate seated state is confirmed. The NC lathe 1 is controlled by the control device 5 receiving this detection signal showing the appropriate seated state, and a cutting process with respect to the subsequent work W is executed. The on-off valve 25 that is illustrated in FIG. 4 remains closed in this case and no air leaks from the adjustment hole 23 with the adjustment flow path 21 blocked.

In the event of the gap G1 between the seating face 611 and the work W, the compressed air leaks from the gap G1 and the back pressure in the secondary-side flow path 132 does not rise. In the work seating detection device 10, the pressure switch 19 is set such that the second contact point 952 is not put into the ON state and no detection signal is sent in a case where the gap G1 is at least 0.05 mm. Accordingly, in the NC lathe 1, no transition is made to the next cutting process and the seating is determined to be inappropriate in a case where the control device 5 does not receive the detection signal within a predetermined period of time from the gripping of the work W by the chuck 6. Then, a warning is displayed on a monitor of the control device 5 or an audible alarm is sounded.

In a case where the gap G1 is present between the seating face 611 and the work W but the value of the gap G1 is less than 0.05 mm, however, the second contact point 952 is put into the ON state within a predetermined period of time by the rising back pressure in the secondary-side flow path 132. Accordingly, in the NC lathe 1, the cutting process with respect to the subsequent work W is executed. As described above, in the work seating detection device 10, the pressure switch 19 needs to be appropriately operated with the reference value of the gap G1 at 0.05 mm. Accordingly, the back pressure adjustment is performed by the following method.

So far, the back pressure adjustment has been performed by a gauge directly abutting against the chuck 6 part in the main body cover 3. In this embodiment, however, the adjustment can be performed by a gauge being handled outside the main body cover 3 instead of inside the main body cover 3. Herein, an adjustment method according to the related art for performing the back pressure adjustment at the chuck 6 part in the main body cover 3 will be described as well. A chuck-side adjustment gauge 90 that is illustrated in FIG. 2 is used for the adjustment method according to the related art.

The chuck-side adjustment gauge 90 is a disk-shaped member, and an annular abutting surface 911 is formed along its outer periphery. The abutting surface 911 is a polished surface with a high level of flatness that is brought into close contact with the seating face 611 of the strip 602. In the abutting surface 911, two adjustment grooves 912 and 913 are formed at positions 180° apart from each other. The adjustment grooves 912 and 913 are superimposed on the detection hole 11 and virtually produce the gap G1 during the processing. Accordingly, during the back pressure adjustment, a confirmation is performed in a state where the adjustment groove 912 or 913 is superimposed on one of the three detection holes 11 and the other two detection holes 11 are blocked by the abutting surface 911. A polished annular abutting surface is formed on the surface of the chuck-side adjustment gauge 90 on the opposite side so that the close contact is confirmed.

Regarding the adjustment grooves 912 and 913 of the abutting surface 911 illustrated in the drawing, the adjustment groove 912 has a depth of 0.03 mm and the adjustment groove 913 has a depth of 0.05 mm. Accordingly, the chuck-side adjustment gauge 90 virtually produces a case where the gap G1 between the work W gripped by the chuck 6 and the seating face 611 is 0.03 mm and a case where the gap G1 between the work W gripped by the chuck 6 and the seating face 611 is 0.05 mm. Specifically, the 0.03 mm gap is one that produces the appropriate seated state and the 0.05 mm gap is one that produces the inappropriate seated state. The on-off valve 25 that is illustrated in FIG. 4 remains closed in this case and no compressed air leaks from the adjustment hole 23 with the adjustment flow path 21 blocked.

The operator causes the chuck-side adjustment gauge 90 to abut against the seating face 611 such that the adjustment groove 912 is superimposed on one of the detection holes 11, and causes the chuck 6 to grip the chuck-side adjustment gauge 90 in this state. The 0.03 mm gap G1 is allowed for the opening portion of the detection hole 11, and thus the back pressure in the secondary-side flow path 132 rises despite the discharge of the compressed air from the detection hole 11 to the atmosphere. The operator confirms the rise in the back pressure by using the back pressure gauge 18 and adjusts the flow rate and pressure of the compressed air so that the back pressure rises to a predetermined first set value within a predetermined period of time. The back pressure adjustment reduces the pressure in the secondary-side flow path 132 with the flow path narrowed or raises the pressure with the flow path widened by the throttle amount of the metering orifice 15 being changed by the flow regulating valve 16.

In the adjustment groove 912 with the 0.03 mm gap G1, the back pressure rises to the first set value within a predetermined period of time and the second contact point 952 of the pressure switch 19 is put into the ON state. However, an excessively high pressure of the compressed air that is fed into the secondary-side flow path 132 in this case might cause the second contact point 952 to be switched into the ON state even in a case where the gap G1 is at least 0.05 mm. In this regard, a confirmation of a case where the adjustment groove 913 of the chuck-side adjustment gauge 90 is superimposed on the detection hole 11 is performed thereafter. According to the adjustment groove 913, the 0.05 mm gap G1 is allowed for the opening portion of the detection hole 11, and thus an even larger amount of the compressed air is discharged from the detection hole 11. In this case, an adjustment is performed so that the back pressure in the secondary-side flow path 132 reaches a second set value which is lower than the first set value. At the second set value of the back pressure, the pressure switch 19 remains in an OFF state with the switching of the second contact point 952 not performed.

The adjustment method according to the related art is carried out by the gap G1 being virtually produced with respect to the detection hole 11 of the chuck 6. However, the adjustment method according to the related art has a low level of workability as described in the Technical Problem section. This is because the chuck 6 is positioned in the main body cover 3 of the NC lathe 1, at a distance from the work entrance 301, although the operator should cause the chuck-side adjustment gauge 90 to abut against the chuck 6. In an operation in which the adjustment grooves 912 and 913 should remain superimposed on the detection hole 11, a hand is unlikely to be seen, and thus it is very difficult to confirm the state. In addition, the chuck 6 and the flow regulating valve 16 are at a distance from each other as well, and it is difficult for the operator to handle both at the same time. In this regard, in this embodiment, the problem is addressed and workability is improved by an adjustment mechanism for back pressure adjustment being additionally disposed in the work seating detection device 10.

The adjustment method according to this embodiment is carried out with the same procedure as the case where the adjustment method is carried out with the chuck 6 part. However, the adjustment method according to this embodiment produces the virtual gap using the gauge not at the chuck 6 part but in the adjustment block 22 which is placed outside the main body cover 3. Herein, an external adjustment gauge 80 is used. The external adjustment gauge 80 is a rectangular parallelepiped block, and an adjustment groove 812 with a depth of 0.03 mm and an adjustment groove 813 with a depth of 0.05 mm are formed in two respective surfaces facing each other. The adjustment grooves 812 and 813 are formed to have the same groove width and length dimensions as well as the same depth dimensions as the adjustment grooves 912 and 913 of the chuck-side adjustment gauge 90 so that gaps of the same conditions as the adjustment grooves 912 and 913 of the chuck-side adjustment gauge 90 are available. The state of a time when the gap G1 is present with respect to the detection hole 11 can be produced in the adjustment block 22 placed outside the main body cover 3 by the adjustment grooves 812 and 813 being superimposed on the adjustment hole 23.

In the adjustment method according to this embodiment, the chuck-side adjustment gauge 90 is gripped by the chuck 6, and then the polished surface on the side opposite to the abutting surface 911 is brought into close contact with the seating face 611 and the detection hole 11 is blocked. The work W itself may be chucked instead of the chuck-side adjustment gauge 90. This is because, in general, the gap G1 has a value of 0.03 mm or less although the gap G1 is caused by the work W, and the discharge of the compressed air is limited. On the adjustment flow path 21 side, in the meantime, the on-off valve 25 that is illustrated in FIG. 4 is opened and the compressed air is discharged to the atmosphere from the adjustment hole 23. Then, the operator presses the external adjustment gauge 80 onto the adjustment face 221 of the adjustment block 22 by causing the adjustment groove 812 to be superimposed on the adjustment hole 23 and maintains the state. As illustrated in FIG. 3, a 0.03 mm gap G2 is allowed for the opening portion of the adjustment hole 23. Accordingly, an inner portion of the secondary-side flow path 132 of the work seating detection device 10 has the same back pressure as in the state where the 0.03 mm gap G1 is allowed for the opening portion of the detection hole 11.

In this case, the back pressure in the secondary-side flow path 132 rises despite the discharge of the compressed air from the adjustment hole 23. The rise in the back pressure is still confirmed by the back pressure gauge 18, and the flow rate and pressure of the compressed air are adjusted so that the back pressure rises to the first set value within a predetermined period of time. The operator adjusts the flow regulating valve 16 installed in the device installation portion 302 close to the external adjustment gauge 80 as illustrated in FIG. 1 while pressing the external adjustment gauge 80 with one hand. The back pressure adjustment reduces the pressure in the secondary-side flow path 132 with the flow path narrowed or raises the pressure with the flow path widened by the throttle amount of the metering orifice 15 being changed by the flow regulating valve 16.

In the adjustment groove 812 with the 0.03 mm gap G2, the back pressure rises to the first set value within a predetermined period of time and the second contact point 952 of the pressure switch 19 is put into the ON state. However, an excessively high compressed air supply pressure in this case might cause the second contact point 952 to be switched into the ON state as well even in a case where the gap G1 in the detection hole 11 is actually at least 0.05 mm. In this regard, the operator reverses the external adjustment gauge 80 thereafter and maintains the state where the adjustment groove 813 is superimposed on the adjustment hole 23. According to the adjustment groove 813, the 0.05 mm gap G2 is allowed for the opening portion of the adjustment hole 23. Accordingly, the inner portion of the secondary-side flow path 132 of the work seating detection device 10 has the same back pressure as in the state where the 0.05 mm gap G1 is allowed for the opening portion of the detection hole 11. In this case, an even larger amount of the compressed air is discharged to the atmosphere from the adjustment hole 23. Accordingly, the back pressure is adjusted to reach the second set value that is lower than the first set value. At the second set value of the back pressure, the pressure switch 19 remains in the OFF state with the switching of the second contact point 952 not performed.

The back pressure adjustment is performed over and over at predetermined time intervals. For example, the seating detection might not be appropriately performed in the event of repeated processing by the NC lathe 1. When the work W is gripped by the chuck 6, processed goods might be subject to the processing defect despite the non-occurrence of chip biting. This is because the back pressure might rise for several reasons, and the second contact point 952 is put into the ON state due to the high back pressure and the seated state is determined to be appropriate due to the detection signal although the gap G of at least 0.05 mm is present in actuality. The back pressure needs to be readjusted in this case, and the operation pressing the external adjustment gauge 80 onto the adjustment block 22 is performed as described above according to the adjustment method of this embodiment.

Accordingly, since the adjustment mechanism for back pressure adjustment is additionally disposed at the place other than the chuck 6 part in the work seating detection device 10 of this embodiment, the back pressure adjustment based on hand extension to the chuck 6 positioned in the main body cover 3 does not have to be performed, which allows workability to be improved. Especially, the adjustment block 22 can be placed at any position by the flexible adjustment hose 210. Accordingly, in this embodiment, workability is significantly improved with the adjustment block 22 mounted at a position on the front surface of the main body cover 3 which allows for the operator's workability. This workability improvement effect can be achieved through a slight change in design from the work seating detection devices according to the related art, and thus a significant cost reduction becomes possible.

In addition, the adjustment mechanism according to this embodiment can be added to the work seating detection devices for processing machines that carry out the adjustment method according to the related art, such as the NC lathes, by a simple improvement. The above-described effects can be achieved at a low cost in this regard as well. In this case, the back pressure adjustment can be performed with the same setting as in the related art by the external adjustment gauge 80 which is provided with the adjustment groove having the same dimension as the chuck-side adjustment gauge 90 in previous use being used.

The work seating detection device 10 allows the inner portion of the secondary-side flow path 132 of the work seating detection device 10 to be in the same state as when the 0.03 mm gap G1 is allowed for the opening portion of the detection hole 11 by producing the 0.03 mm gap G2 in the opening portion of the adjustment hole 23. This is on a condition that the pressures in the secondary-side flow path 132 and the adjustment flow path 21 are uniform. In a case where the secondary-side flow path 132 and the adjustment flow path 21 are configured to use the flexible hose 210 or the like, the hose 210 might be deformed by the pressure of the compressed air. It is conceivable that the internal pressures of the secondary-side flow path 132 and the adjustment flow path 21 do not become uniform in this case. In this regard, it is preferable that the secondary-side flow path 132 and the adjustment flow path 21 are pipe members formed of the same material between the position where both the flow paths branch, and the detection hole 11 and the adjustment hole 23 and both the pipe members have the same dimension so that the internal pressure becomes uniform under the same conditions.

The work seating detection device 10 according to this embodiment can perform the back pressure adjustment according to the related art, which is performed at the chuck 6 part, at another place. Since the adjustment flow path is allowed to branch with the configuration according to the related art used as it is, the flow path configuration needs to conform to the detection flow path 13. This is the same for the external adjustment gauge 80 as well. In this regard, the adjustment grooves 812 and 813 of the external adjustment gauge 80 need to conform to the adjustment grooves 912 and 913 of the chuck-side adjustment gauge 90 as described above. Still, the external adjustment gauge 80 is carried out with respect to the one adjustment hole 23, and thus can be smaller than the chuck-side adjustment gauge 90.

The embodiment of the present disclosure has been described above. The present disclosure is not limited to the embodiment, and can be modified in various forms without departing from the scope of the present disclosure.

In the above-described embodiment, the NC lathe has been used for description as an example of the processing machine. However, the processing machine is not limited to the NC lathe insofar as the processing machine is provided with the work seating detection device.

In addition, although a case where the adjustment block is fixed outside the main body cover 3 has been described in the above-described embodiment, the adjustment block may be fixed, for example, inside the closed slide door in the work entrance 301 insofar as workability can be improved. In other words, the installation position of the adjustment block is not limited to the inside or outside of the main body cover 3 in view of workability.

In addition, the configuration of the work seating detection device 10 is an example, and other structures may be adopted instead. Although the metering orifice 15 and the flow regulating valve 16 are integrated with each other in this embodiment described above, a structure in which a needle valve is disposed in the secondary-side flow path 132 and the connection flow path 193 may be also possible as disclosed in, for example, JP-A-10-332356.

In addition, although the external adjustment gauge 80 is pressed onto the adjustment block 22 by the operator in the above-described embodiment, a structure may be also possible in which the external adjustment gauge 80 is held in a state where the external adjustment gauge 80 abuts against the adjustment block 22.

REFERENCE SIGNS LIST

1: NC lathe
3: main body cover
6: chuck
10: work seating detection device
11: detection hole
13: detection flow path
15: metering orifice
16: flow regulating valve
18: back pressure gauge
19: pressure switch
21: adjustment flow path
22: adjustment block
23: adjustment hole
80: external adjustment gauge

The invention claimed is:

1. A work seating detection device comprising:
a detection hole formed to discharge air from a work seating face of a chuck gripping a work;
a detection flow path connecting an air supply source supplying the air at a predetermined pressure and the detection hole to each other;
a pressure switch detecting a secondary-side pressure of a throttle portion formed in the detection flow path; and
a pressure regulator adjusting the secondary-side pressure,
wherein an adjustment flow path branching on a secondary side of the throttle portion is formed in the detection flow path,
wherein an on-off valve is disposed at any position of the adjustment flow path,
wherein an adjustment block provided with an adjustment face pressing an adjustment gauge is integrally formed in a tip portion,
wherein an adjustment hole having the same size as the detection hole and communicating with the adjustment flow path is formed in the adjustment block for an opening portion to be positioned in the adjustment face,
wherein the adjustment gauge includes an adjustment groove, a depth of the adjustment groove corresponding to a predetermined distance between the detection hole and the work gripped by the chuck, and
wherein when the adjustment gauge is pressed against the adjustment face of the adjustment block such that the adjustment groove is in fluid communication with the adjustment hole, the secondary-side pressure of the throttle portion increases.

2. The work seating detection device according to claim 1,
wherein the chuck is placed in a processing machine main body provided with a processing tool processing the gripped work and the adjustment block is placed outside the processing machine main body.

3. The work seating detection device according to claim 1,
wherein a flexible pipe member forms the adjustment flow path and the adjustment block can be placed at any position.

4. The work seating detection device according to claim 3,
wherein the detection flow path and the adjustment flow path are formed by the pipe members of the same material between a branching position, and the detection hole and the adjustment hole and both the pipe members are formed to have the same dimension.

5. The work seating detection device according to claim 1,
wherein the adjustment gauge is a rectangular parallelepiped block including a first adjustment groove on a first face and a second adjustment groove on a second face.

6. An adjustment method for a work seating detection device including a detection hole formed to discharge air from a work seating face of a chuck gripping a work, a detection flow path connecting an air supply source supplying the air at a predetermined pressure and the detection hole to each other, a pressure switch detecting a secondary-side pressure of a throttle portion formed in the detection flow path, and a pressure regulator adjusting the secondary-side pressure, in which an adjustment flow path branching on a secondary side of the throttle portion is formed in the detection flow path, an on-off valve is disposed at any position of the adjustment flow path, an adjustment block provided with an adjustment face pressing an adjustment gauge is integrally formed in a tip portion, and an adjustment hole having the same size as the detection hole and communicating with the adjustment flow path is formed in the adjustment block for an opening portion to be positioned in the adjustment face, the adjustment method comprising:
allowing a virtual work to be gripped by the chuck such that the detection hole is blocked by the virtual work having a flat abutting surface being allowed to abut against the work seating face;
pressing the adjustment gauge with an adjustment groove against the adjustment face of the adjustment block such that the adjustment groove is in fluid communication with the adjustment hole, and the secondary-side pressure of the throttle portion increases; and
operating the pressure regulator such that the secondary-side pressure changing depending on a size of the adjustment groove of the adjustment gauge corresponds to a predetermined set value,
wherein a depth of the adjustment groove is equal to a predetermined distance between the detection hole and the work gripped by the chuck.

7. The adjustment method for a work seating detection device according to claim 6,
wherein an adjustment gauge where the adjustment groove having a same dimension as an adjustment groove of a chuck adjustment gauge is formed is used as the adjustment gauge and the pressure regulator is operated such that the secondary-side pressure reaches the same set value as a value of when the operation is performed by use of the chuck adjustment gauge in a case where the operation of the pressure regulator is performed by the chuck adjustment gauge with the groove where the adjustment groove discharging the air from the detection hole is formed abutting against the seating face such that the secondary-side pressure changing depending on the size of the adjustment groove of the chuck adjustment gauge corresponds to the predetermined set value.

8. The adjustment method for a work seating detection device according to claim 6,
wherein the adjustment gauge is a rectangular parallelepiped block including a first adjustment groove on a first face and a second adjustment groove on a second face.

* * * * *